US 7,093,577 B2

(12) United States Patent
Tohyama

(10) Patent No.: US 7,093,577 B2
(45) Date of Patent: *Aug. 22, 2006

(54) RECOIL STARTER

(75) Inventor: Isao Tohyama, Suginami-ku (JP)

(73) Assignee: Starting Industrial Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/857,961

(22) Filed: Jun. 2, 2004

(65) Prior Publication Data

US 2004/0250787 A1    Dec. 16, 2004

(30) Foreign Application Priority Data

Jun. 2, 2003    (JP)    ............................ P.2003-156817

(51) Int. Cl.
*F02N 3/02*    (2006.01)
(52) U.S. Cl. ...................... 123/185.3; 267/155
(58) Field of Classification Search ................. 267/155
See application file for complete search history.

(56) References Cited

U.S. PATENT DOCUMENTS

| | | | |
|---|---|---|---|
| 1,990,295 A | 2/1935 | Lingo | |
| 2,043,152 A * | 6/1936 | Cook | ........................ 267/155 |
| 3,306,277 A | 2/1967 | Gudmundsen | |
| 5,287,832 A | 2/1994 | Uhl | |
| 6,588,390 B1 | 7/2003 | Kawasaki et al. | |
| 2001/0047786 A1 | 12/2001 | Kawasaki et al. | |
| 2003/0015162 A1 | 1/2003 | Harada et al. | |
| 2003/0094154 A1 | 5/2003 | Morishige et al. | |
| 2003/0213455 A1 | 11/2003 | Tohyama | |
| 2004/0016311 A1 | 1/2004 | Hasiba | |
| 2004/0123827 A1 * | 7/2004 | Tsunoda et al. | ......... 123/185.3 |

FOREIGN PATENT DOCUMENTS

| | | |
|---|---|---|
| JP | 6-16964 Y2 | 5/1994 |
| JP | 2-149872 U | 12/1999 |

* cited by examiner

*Primary Examiner*—Andrew M. Dolinar
(74) *Attorney, Agent, or Firm*—Nixon & Vanderhye P.C.

(57) ABSTRACT

A damper spring having a torsion coil spring-like shape is placed on outer peripheries of bosses respectively formed on a rope reel and a cam. The ends of the damper spring are engaged with the rope reel and the cam, respectively, so that the rope reel and the cam are rotatingly coupled with each other. A wire member constituting the damper spring is formed so as to have a section shape in which at least one side is linearly formed, and the damper spring is formed by winding the wire member into a coil-like shape so that the linear portion of the wire member is placed on an inner peripheral side, thereby enabling the inner side face of the damper spring to be tightly wound in a wide area around outer peripheral faces of the bosses.

2 Claims, 6 Drawing Sheets

RECOIL STARTER

BACKGROUND OF THE INVENTION

1. Field of the Invention

The present invention relates to a recoil starter in which a rope reel is rotated by pulling a recoil rope wound around the rope reel, the rotation of the rope reel is transmitted via a one-way clutch mechanism such as a centrifugal ratchet mechanism to a rotary member such as a flywheel magnet coupled to a crankshaft of an engine, to rotate the rotary member, whereby the crankshaft is rotated to start the engine.

2. Description of the Related Art

It has been known to employ the following structure in a recoil starter in which a rope reel is rotated by pulling a recoil rope wound around the rope reel, and the rotation of the rope reel is transmitted via a one-way clutch mechanism such as a centrifugal ratchet mechanism to a rotary member such as a flywheel magnet or a driving pulley coupled to a crankshaft of an engine, to rotate the rotary member, whereby the crankshaft is rotated to start the engine. A cam is rotatably placed between the rope reel around which the recoil rope is wound; and the rotary member which is coupled to the crankshaft, and the one-way clutch mechanism is formed between the cam and the rotary member. A damper spring which is wound into a torsion coil spring-like shape is interposed between the rope reel and the cam to elastically couple the rope reel with the cam, so that the rotation of the rope reel is transmitted to the cam via the damper spring, whereby a shock which is caused by load variation during engine start, and which is transmitted to the hand is absorbed. Moreover, the rotational force of the rope reel is accumulated in the damper spring, and the crankshaft is rotated at a high speed by the accumulated rotational force.

A conventional recoil starter is configured in the following manner (for example, see JP-UM-A-2-149872). A rope reel around which a recoil rope is wound, and a cam which forms a clutch mechanism with respect to a driving pulley coupled to a crankshaft of an engine are rotatably supported by a support shaft formed in a case. Bosses having the same outer diameter are formed on the outer peripheral faces of the rope reel and the cam, respectively. A damper spring which is formed into a torsion coil spring-like shape is mounted on the outer peripheries of the bosses. The both ends of the damper respectively, so that the rope reel and the cam are coupled with each other in the rotation direction via the damper spring. When the recoil rope is pulled, the rope reel is rotated. The rotation of the rope reel is transmitted to the cam via the damper spring. The cam is blocked from rotating by the starting resistance of the engine, and the damper spring is twisted to buffer a shock to the rope reel. At the same time, the rotational force of the rope reel is accumulated in the damper spring as a result of the twisting of the damper spring. When the rotational force of the rope reel exceeds the starting resistance of the engine, the rotational force accumulated in the damper spring is released to rotate the cam, whereby the engine is started.

In a recoil starter in which a torsion coil-like damper spring is placed between a rope reel and a cam as described above, in the case where an engine has a large starting resistance, a phenomenon occurs that, when the damper spring is twisted to accumulate the rotational force, the damper spring is tightly wound around outer peripheral faces of the rope reel and the cam. In the conventional art described above, the damper spring is formed into a torsion coil spring-like shape in which a steel wire member having a circular section shape is spirally wound in a plurality of turns. The damper spring is strongly tightly wound around outer peripheral faces of bosses formed on the rope reel and the cam, and the wire member of the damper spring having a circular section shape enters between joining faces of the bosses of the rope reel and the cam. Therefore, the cam is pressed in the axial direction to increase the rotational resistance, or a part of the damper spring is irregularly deformed, so that the durability of the damper spring is impaired.

Components such as the rope reel and the cam are often made of a plastic material in order to reduce the weight. When the damper spring having a circular section shape is strongly tightly wound around outer peripheral faces of such components, therefore, the outer peripheral faces of the components are deformed because the contact areas between the spring and the components are narrow, thereby causing another problem in that the durabilities of the components are impaired. In order to enhance the capacity for accumulating a rotational force in the damper spring so as to enable the engine to be easily started, the diameter of the wire member constituting the damper spring may be enlarged, and the number of turns may be increased. However, this countermeasure involves a problem in that the total length of the damper spring is prolonged, and the size of the recoil starter is increased, with the result that it is impossible to miniaturize the recoil starter.

SUMMARY OF THE INVENTION

It is an object of the invention to provide a recoil starter which can solve the problems of the conventional art, in which a sufficiently large rotational force can be accumulated in a damper spring, and components made of a plastic material are not damaged, and which can be miniaturized and lightened.

In order to accomplish the object, according to a first aspect of the invention, there is provided a recoil starter including: a rope reel which is rotatably mounted on a support shaft that is formed inside a case, and around which a recoil rope is wound; a recoil spring which rotationally urges the rope reel in a direction of taking up the recoil rope; a cam which is disposed rotatably with respect to the support shaft; a rotary member on which a one-way clutch mechanism is disposed, and which is to be attached to a crankshaft of an engine, the one-way clutch mechanism being engaged and disengaged with the cam; bosses which are placed respectively on the rope reel and the cam to butt against each other, and which have a same outer diameter; and a damper spring which is placed on outer peripheries of the bosses, ends of which are engaged with the rope reel and the cam, respectively, and which has a torsion coil spring-like shape, a rotational force of the rope reel being to be transmitted to the cam via an elastic force of the damper spring, to start the engine, wherein a wire member constituting the damper spring is formed to have a section shape in which at least an inner peripheral side is linearly formed, thereby enabling an inner side face of the damper spring to be tightly wound in a wide area around outer peripheral faces of the bosses.

Further, in the recoil starter, the ends of the damper spring are supported to be radially movable with respect to the rope reel and the cam, and, when the damper spring is elastically deformed by a starting resistance of the engine, a substantially whole length of a wound portion of the damper spring is uniformly tightly wound around the outer peripheral faces of the bosses respectively formed on the rope reel and the cam.

Further, in the recoil starter, end faces of the bosses which are formed respectively on the rope reel and the cam butt against each other in a substantially middle position of a wound portion of the damper spring.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
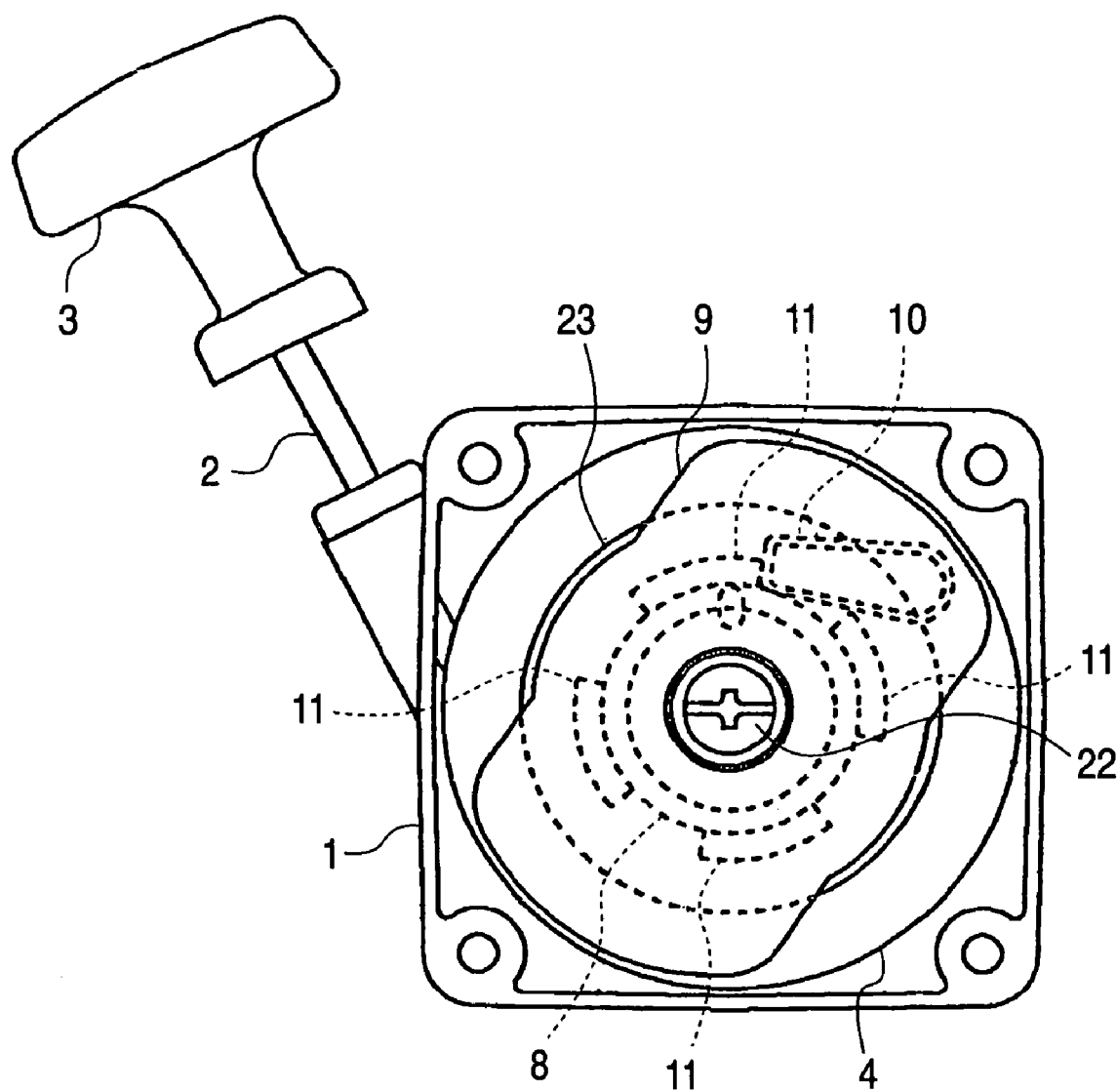
FIG. 1 is a front view of a recoil starter of an example of the invention.

Hereinafter, an embodiment of the invention will be described based on an example shown in the drawings. In the recoil starter of the invention, as shown in FIG. 1, a handle 3 is coupled to an end portion of a recoil rope 2 which is exposed to the outside of a case 1. When the handle is pulled, a rope reel 4 housed in the case 1 is rotated, so that a rotary member 9 coupled to a crankshaft of an engine is rotated via a ratchet member 10 which is to be engaged with cam pawls 11 formed on an outer peripheral face of a cam 8 that is rotated by the rope reel 4. As a result, the engine is started.

Figure 2:
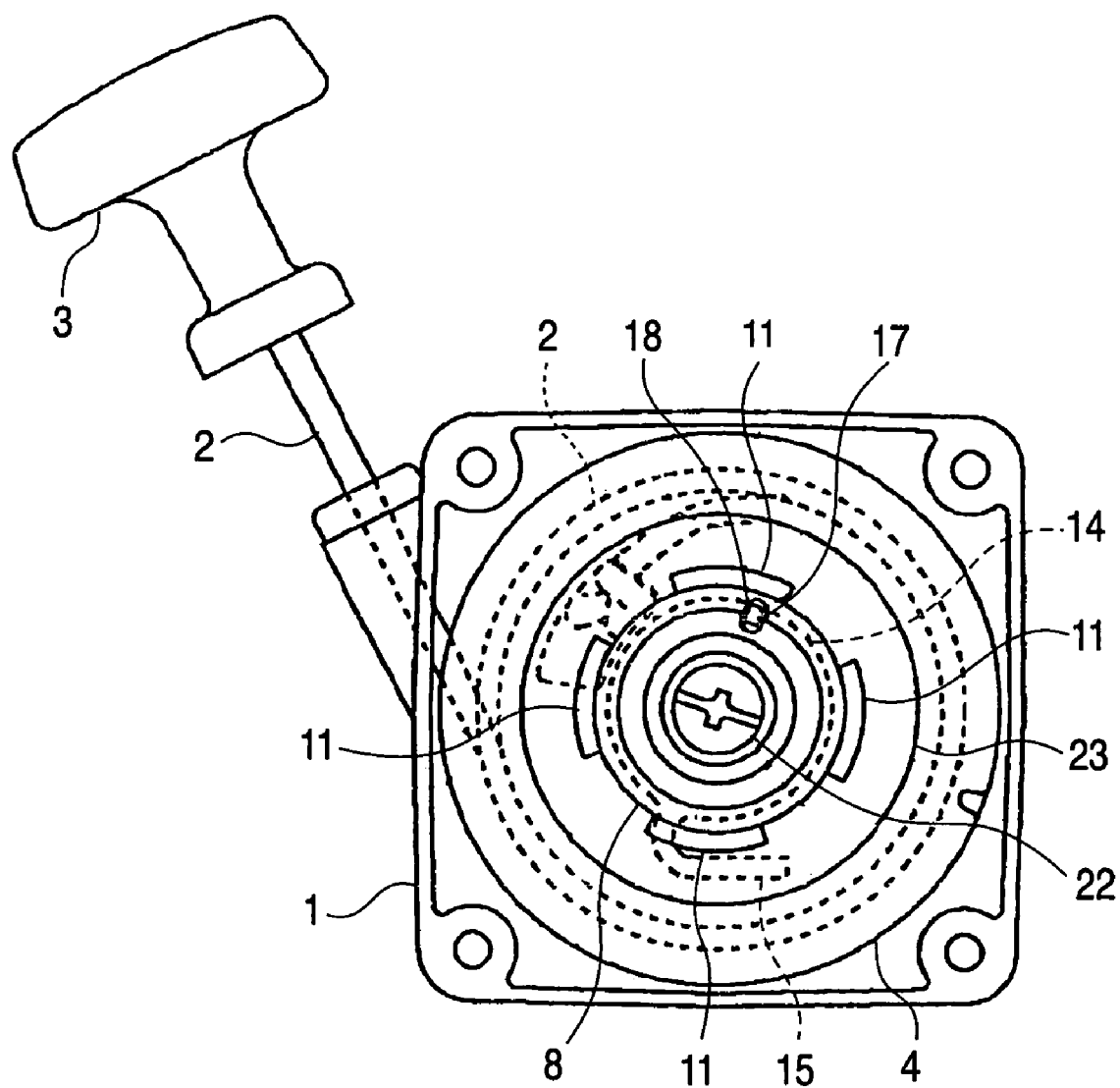
FIG. 2 is a front view of the recoil starter of FIG. 1 in a state where a rotary member is removed away.
Figure 3:
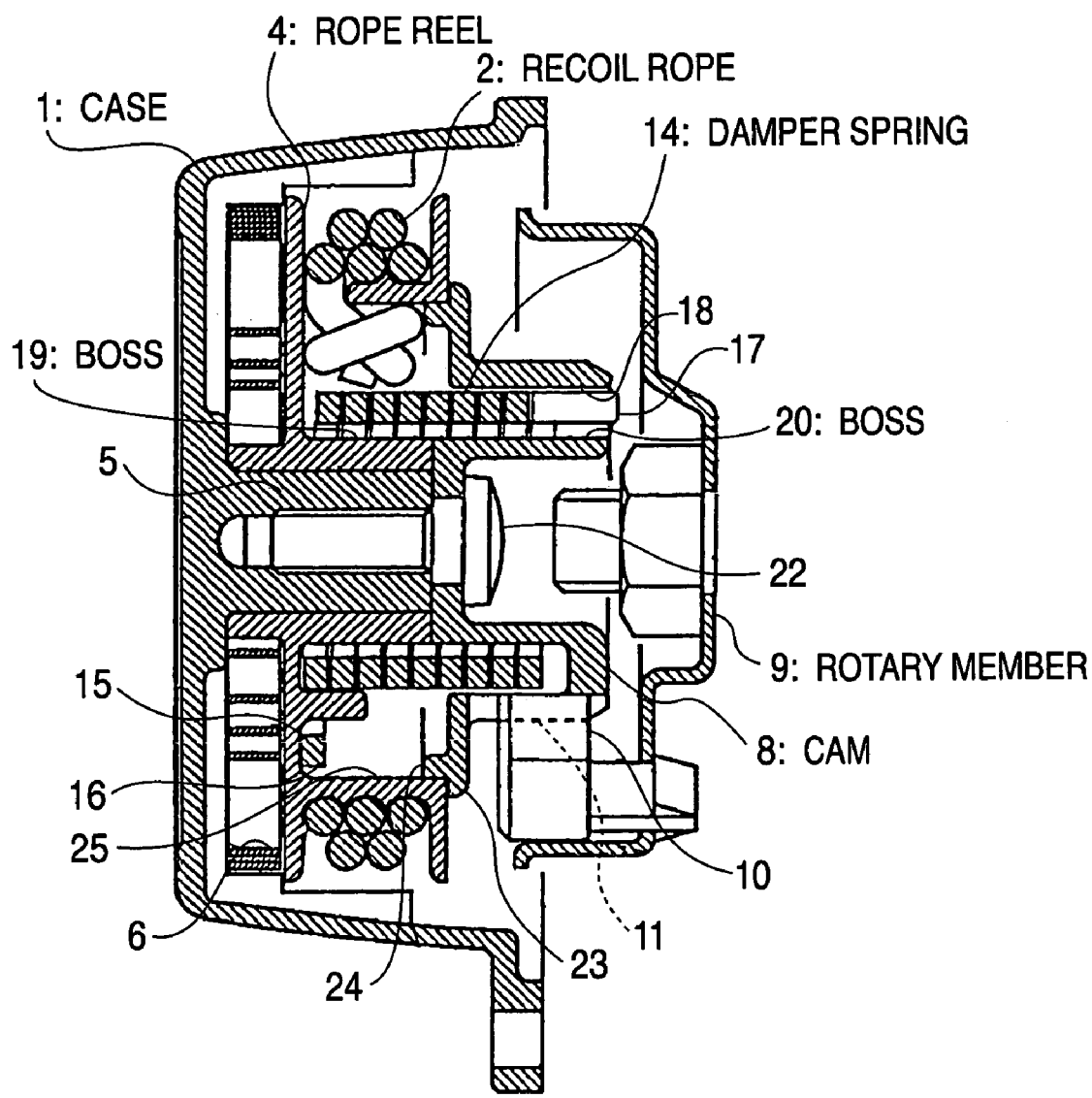
FIG. 3 is a longitudinal side section view of the recoil starter of FIG. 1.

As shown in FIGS. 2 and 3, the rope reel 4 around which the recoil rope 2 is wound is rotatably supported by a support shaft 5 that is protruded inside the case 1 so as to be integral with the case 1. One end of the recoil rope 2 wound around the rope reel 4 is led to the outside of the case 1, and the other end of the rope is fixed to the rope reel 4. The tip of the one end which is led to the outside of the case 1 is coupled to a handle 3 for manually pulling the recoil rope 2. When the handle 3 is pulled, the recoil rope 2 is drawn out from the rope reel 4, and the rope reel 4 is rotated about the support shaft 5.

A recoil spring 6 is placed between a side face of the rope reel 4 and an inner wall face of the case 1. The recoil spring operates to reversely rotate the rope reel 4 which has been rotated by the operation of pulling the recoil rope 2, thereby rewinding the recoil rope 2 which has been drawn out, around the rope reel 4. In the recoil spring 6, one end on the side of the inner periphery is fixed to the case 1, and the other end on the side of the outer periphery is fixed to the rope reel 4. When the recoil rope 2 is pulled and the rope reel 4 is rotated, the rotational force is accumulated in the recoil spring 6, and, when the force of pulling the recoil rope 2 is released, the rope reel 4 is rotated in the opposite direction by the rotational force accumulated in the recoil spring 6, so that the recoil rope 2 is rewound around the rope reel 4.

The cam 8 which transmits the rotation of the rope reel 4 toward the crankshaft of the engine is rotatably attached by a screw 22 to an end face of the reel support shaft 5 formed in the case 1. The cam pawls 11 which are to be engaged and disengaged with the ratchet member 10 formed on the rotary member 9 coupled to the crankshaft of the engine are arranged on the cam 8 in the circumferential direction. When the cam pawls 11 are engaged with the ratchet member 10 of the rotary member 9, the rotation of the cam 8 is transmitted via the rotary member 9 to the crankshaft of the engine. In the example, the ratchet member 10 is configured as a centrifugal clutch. After the engine is started, the rotary member 9 is rotated by the engine, and the ratchet member 10 is swung by a centrifugal force in a direction along which the ratchet member is disengaged from the cam pawls 11, so that the rotational transmission between, the engine and the cam 8 is interrupted.

Figure 4:
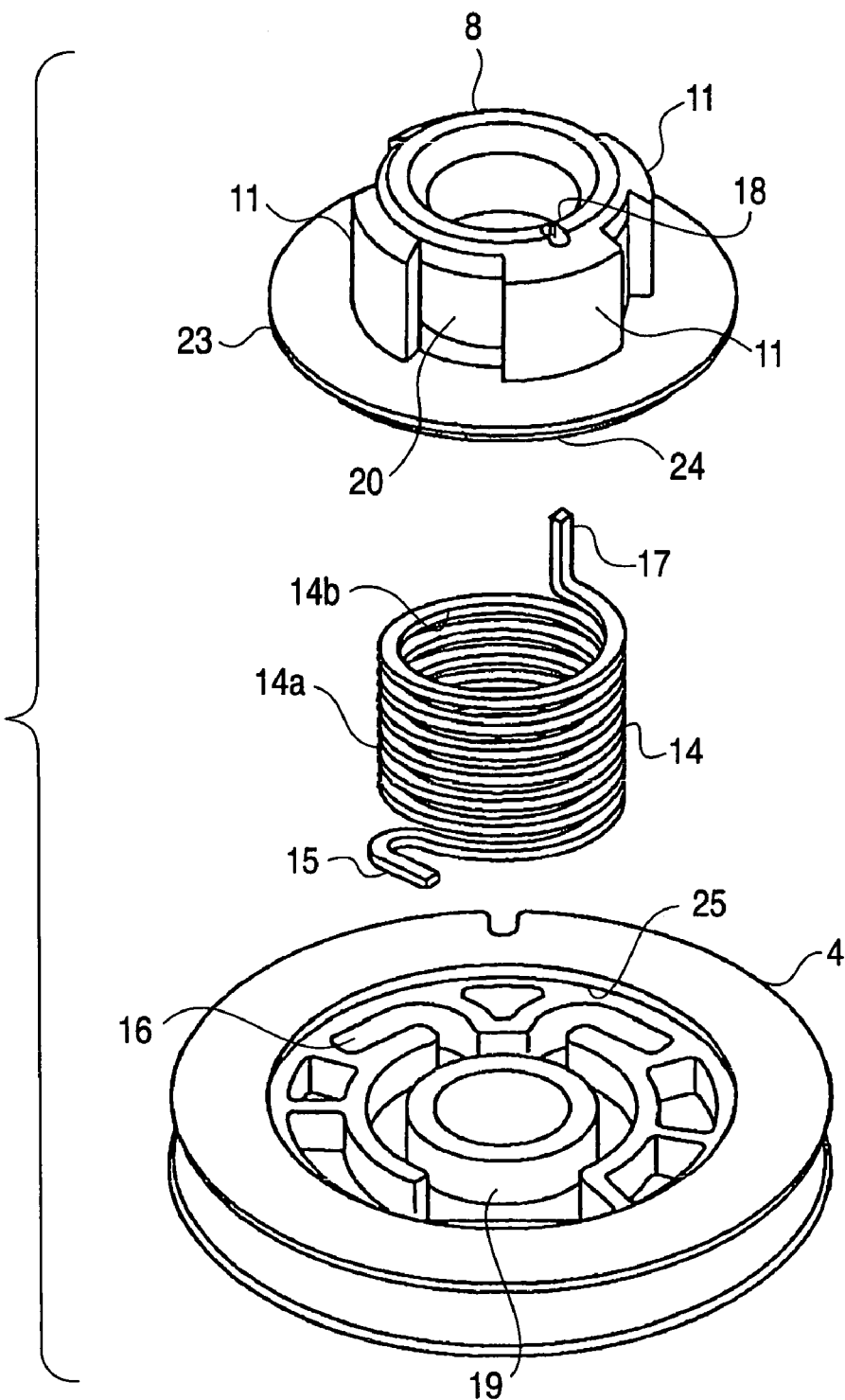
FIG. 4 is a perspective view showing a rope reel, a damper spring, and a cam in the example of FIG. 1.

Bosses 19, 20 which are formed so as to have the same outer diameter are formed on the rope reel 4 and the cam 8, respectively. The bosses 19, 20 are placed so that their end faces are opposed to each other. A damper spring 14 which rotatingly couples the rope reel 4 with the cam 8 is placed on the outer peripheries of the bosses 19, 20. As shown in FIG. 4, the damper spring 14 is formed into a torsion coil spring-like shape in which a steel wire 14a is spirally wound in a plurality of turns. The steel wire has a rectangular section shape in which all the sides are linearly formed, and the spiral winding of the steel wire is conducted so that one linear side 14b is on the side of the inner periphery. An engagement end portion 15 which is bent into a U-like shape in a horizontal plane is formed in one end of the damper spring 14, and an engagement end portion 17 which is bent in the axial direction is formed in the other end of the damper spring 14. The engagement end portion 15 is accommodated in an engagement groove 16 formed in the outer peripheral side of the boss 19 of the rope reel 4, and the engagement end portion 17 is passed through an engagement hole 18 which is pierced in an end portion of the boss 20 of the cam 8 to reach the end face of the cam 8, whereby the rope reel 4 and the cam 8 are rotatingly coupled with each other via the damper spring 14.

The damper spring 14 is placed so that the butting portions of the end faces of the bosses 19, 20 formed on the rope reel 4 and the cam 8 exist in a substantially middle of the wound portion of the damper spring 14. The diameter of the inner peripheral face formed by the linear side 14b of the damper spring 14 is set so as to, in the free state, be larger than the outer diameters of the bosses 19, 20. In the mounted state, a gap is formed between the inner peripheral face formed by the linear side 14b of the damper spring 14, and the outer peripheral faces of the bosses 19, 20. The inner peripheral face of the damper spring 14 which is formed by the wire member 14a having a rectangular section shape forms a generally cylindrical face. When a rotational force of a predetermined level is accumulated in the damper spring 14 due to the starting resistance of the engine, the wound portion of the damper spring 14 is reduced in diameter to be tightly wound in a substantially uniform manner around the outer peripheral faces of the bosses 19, 20 of the rope reel 4 and the cam 8. As a result, the inner peripheral face of the damper spring is in close contact in a wide area with the outer peripheral faces of the bosses 19, 20, whereby the damper spring 14 is suppressed from being further elastically deformed, and the maximum stress is limited.

Figure 5:
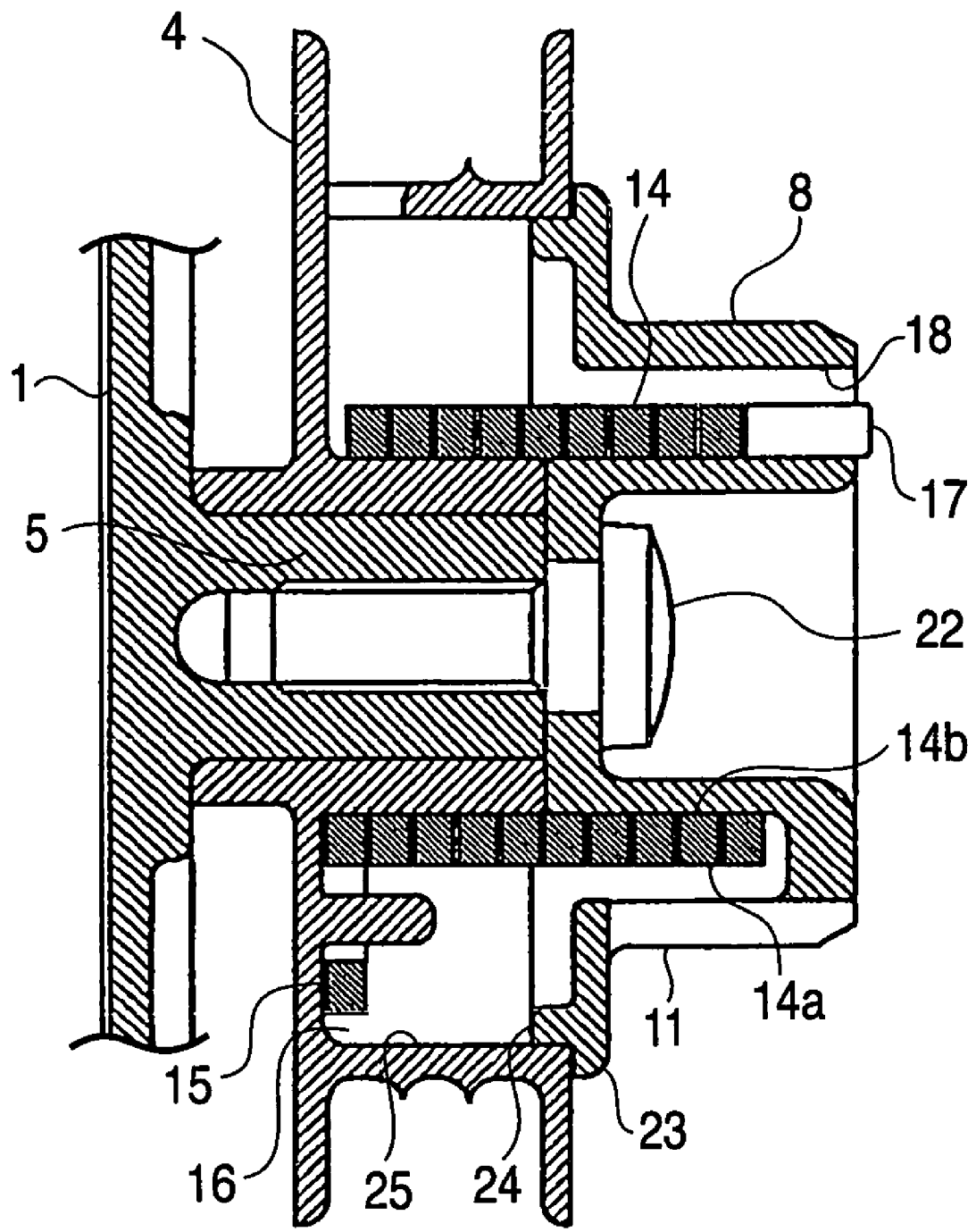
FIG. 5 is a longitudinal side section view of the recoil starter of FIG. 3 in a state where the damper spring is tightly wound.

The engagement end portion 15 of the damper spring 14 which is engaged with the rope reel 4 is accommodated in the engagement groove 16 in such a manner that the terminal portion is movable toward the outer peripheral face of the boss 19 of the rope reel 4. The engagement end portion 17 on the other end side of the damper spring 14 is loosely fitted into the engagement hole 18 which is formed in an end portion of the cam 8 and prolonged in a radial direction, so that the terminal portion can move closer to the outer peripheral face of the boss 20 of the cam 8. According to the configuration, when the wound portion of the damper spring 14 is tightly wound around the bosses 19, 20, the whole length of the wound portion of the damper spring 14 is uniformly tightly wound around the bosses 19, 20 as shown in FIG. 5. This state is identical with that of a known spring clutch mechanism. Namely, when the wound portion of the damper spring 14 is tightly wound around the bosses 19, 20 of the rope reel 4 and the cam 8, the bosses 19, 20 are coupled with each other in the rotation direction, so that uneven displacement does not occur in the damper spring 14.

As shown in FIGS. 3 and 4, a flange 23 which is radially outward projected is formed integrally on one side of the cam 8. An annular guide 24 which is protrudingly formed on an outer peripheral side face of the flange 23 is housed in an annular recess 25 formed in a side face of the rope reel 4, to guide the relative rotation between the cam 8 and the rope reel 4. The rope reel 4 is attached to the support shaft 5 formed in the case 1. The damper spring 14 is mounted on the boss 19 of the rope reel 4 while the one end of the damper spring 14 is engaged with the engagement groove 16 of the rope reel 4. The cam 8 is placed on the side face the rope reel 4 so that the engagement end portion 17 on the other end side of the damper spring 14 is passed through the engagement hole 18 which is formed in the cam 8. Then, the screw 22 is fastened to the tip end of the support shaft 5, whereby the cam 8 and the rope reel 4 are incorporated into the case 1. In the cam 8, the center portion is supported by the basal portion of the screw 22 so as to be rotatable with respect to the support shaft 5, and the outer peripheral edge of the flange 23 is rotatably supported by the annular recess 25 of the rope reel 4. Therefore, inclination of the cam 8 due to an offset load acting on the cam 8 can be suppressed, and hence destruction due to an offset load can be prevented from occurring.

The operation of the recoil starter of the example will be described. Before a starting operation is conducted on the engine, the ratchet member 10 formed on the rotary member 9 coupled to the crankshaft of the engine is in the state where the member is inward moved by the function of an urging spring, and placed in a position where the member butts against the cam pawls 11 formed in the cam 8. When the recoil rope 2 is pulled, the rope reel 4 is rotated, and the cam 8 is rotated integrally therewith via the damper spring 14. The cam pawls 11 of the cam 8 butt against the ratchet member 10 to rotate the rotary member 9 via the ratchet member 10, and the crankshaft coupled with the rotary member 9 is rotated. At this time, the rotational load is increased by the starting resistance of the engine, and the rotational load of the cam 8 is increased. However, the damper spring 14 is twisted to absorb the load, and hence a shock is not transmitted directly toward the recoil rope 2.

When the rotation of the cam 8 is stopped by the starting resistance of the engine, the damper spring 14 is twisted, so that the rotational force of the rope reel 4 is accumulated in the damper spring 14. As shown in FIG. 5, when the damper spring 14 is twisted and the diameter of the wound portion is reduced, the damper spring is tightly wound around the outer peripheral faces of the bosses 19, 20 of the rope reel 4 and the cam 8, so that no further stress acts on the damper spring 14. The wire member 14a constituting the damper spring 14 is formed so as to have a rectangular section shape in which the inner side is the linear side 14b, and, when the damper spring is tightly wound, the inner peripheral face of the damper spring 14 is in close contact in a wide cylindrical area with the bosses 19, 20. Therefore, an impression or the like is not formed on the bosses 19, 20 by the wire member 14a, the rope reel 4 and the cam 8 are integrally coupled with each other via the damper spring 14 by the function of the spring clutch, and the rotation of the rope reel 4 is transmitted directly to the cam 8. At this time, the engagement end portions 15, 17 in the ends of the damper spring 14 are inward moved, and hence a substantially whole length of the wound portion of the damper spring 14 is in close contact with the outer peripheral faces of the bosses 19, 20, so that excessive stress is not produced in the basal portion of the damper spring 14.

When the rope reel 4 is further rotated and the rotational force exceeds the starting resistance of the engine, the rotational force of the rope reel 4 due to the pulling of the recoil rope 2, and that accumulated in the damper spring 14 are released toward the cam 8 to be transmitted to the rotary member 9 via the ratchet member 10, with the result that the crankshaft of the engine is rotated in a single burst and the engine is started. When the engine is started and the crankshaft is rotated thereby, the ratchet member 10 is outward swung by a centrifugal force, and the butting against the cam pawls 11 of the cam 8 is cancelled. When the recoil rope 2 is released after the engine is started, the rope reel 4 is rotated in the opposite direction by the rotational force accumulated in the recoil spring 6, so that the recoil rope 2 is rewound around the rope reel 4.

Figure 6:
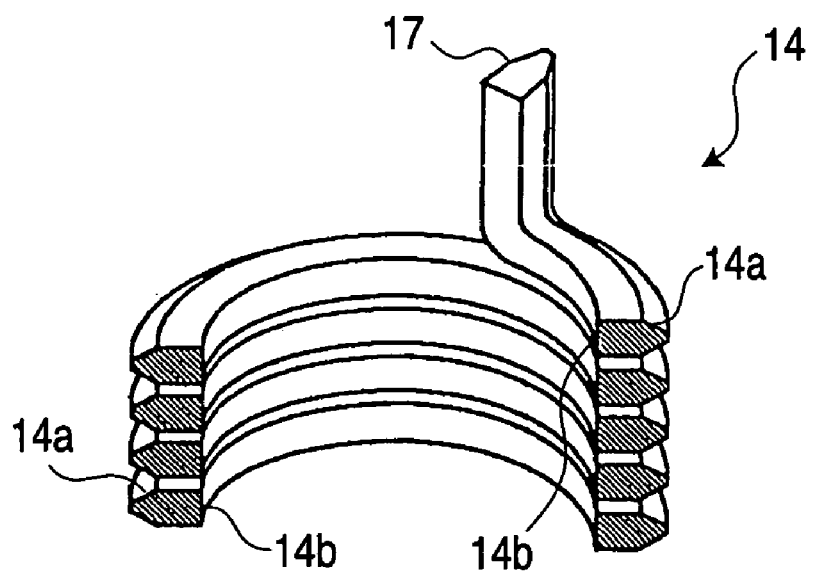
FIG. 6 is a perspective view showing another example of the damper spring, in partial section.
Figure 7:
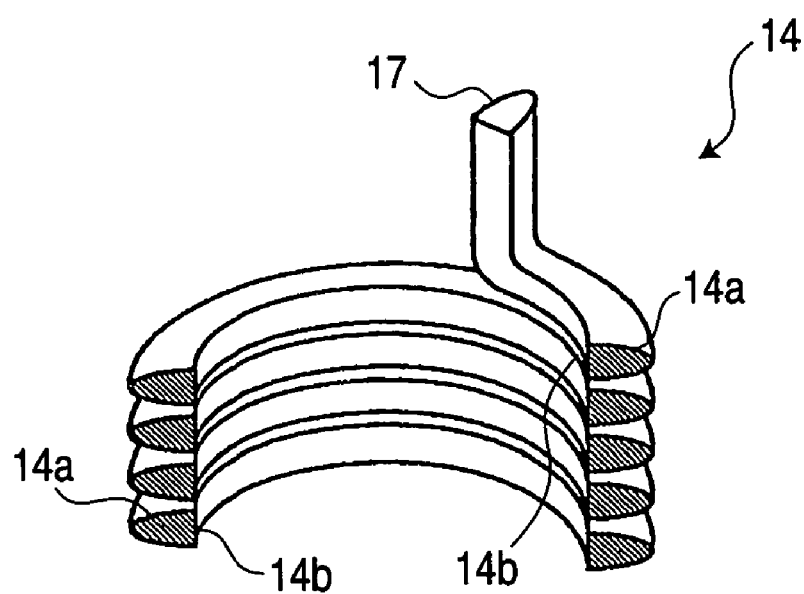
FIG. 7 is a perspective view showing a further example of the damper spring, in partial section.

FIGS. 6 and 7 show other examples of the damper spring 14 which is useful in the recoil starter of the invention. In the damper spring 14 shown in FIG. 6, the wire member 14a constituting the damper spring 14 is formed so as to have a hexagonal section shape in which the linear side 14b is formed on the inner peripheral face side that is wound into a coil-like shape. In the example of the damper spring 14 shown in FIG. 7, the steel wire member 14a constituting the damper spring 14 is formed so as to have a half-elliptical section shape in which the linear side 14b is formed on the inner peripheral face side that is wound into a coil-like shape. In the examples also, in the same manner as the example described above, when the damper spring 14 is tightly wound around the outer peripheral faces of the bosses 19, 20 of the rope reel 4 and the cam 8, the damper spring 14 is in close contact in a wide area formed by the linear side 14b of the wire member 14a with the outer peripheral faces of the bosses 19, 20. Therefore, it is possible to prevent an impression from being formed on the bosses 19, 20 by the wire member 14a to impair the durabilities of the components, or to prevent the wire member 14a from entering the gap between butting faces of the bosses 19, 20 to block the rotations of the rope reel 4 and the cam 8.

As described above, according to the invention, the wire member constituting the damper spring is formed to have the section shape in which at least one side is linearly formed, and the damper spring is formed by winding the wire member into a coil-like shape in which a linear portion of the wire member is placed on an inner peripheral side. When an excessive load is produced on the side of the engine, the damper spring is tightly wound around outer peripheral faces of bosses formed on the rope reel and the cam, to suppress the damper spring from being largely displaced. Therefore, reduction of the durability due to excessive displacement of the damper spring can be prevented from occurring. Moreover, the inner peripheral face formed by the linear portion of the damper spring is tightly wound in a wide area around the outer peripheral faces of the bosses. Therefore, an impression or the like is not formed on the bosses by the damper spring, and the wire constituting the damper spring can be prevented from entering the gap between the bosses to block the rotation of the cam.

Since the wire member constituting the damper spring is formed to have a section shape in which at least one side is linearly formed, the sectional area of the wire member can be made larger than that of a conventional wire member having a circular section shape, without increasing the dimension of the wire member in the thickness direction. Therefore, a damper spring of a larger elastic force can be formed without increasing the whole shape of the damper spring, and, in order to attain the same elastic force, the number of turns can be increased, so that a rotation force at a larger rotation angle can be accumulated. Consequently, a damper spring of a larger elastic force, or that having an accumulation capacity at a larger rotation angle can be housed in a case having the same external shape. In the case of a damper spring having the same elastic force and an accumulation capacity at the same rotation angle, the recoil starter can be further miniaturized and lightened.

According to the invention, engagement end portions of the ends of the damper spring are supported to be radially movable with respect to an engagement groove and an engagement hole of the rope reel and the cam, and, when the damper spring is elastically deformed, a substantially whole length of a wound portion of the damper spring is uniformly tightly wound around the outer peripheral faces of the bosses respectively formed on the rope reel and the cam. Therefore, the rope reel and the cam can be integrally rotatingly coupled with each other by the function of a spring clutch, so that stress produced in the engagement end portions of the ends of the damper spring can be suppressed to a low level. As a result, it is possible to enhance the durability of the damper spring.

What is claimed is:

1. A recoil starter comprising:
   a rope reel rotatably mounted on a support shaft that is formed inside a case and around which a recoil rope is wound;
   a recoil spring which rotationally urges the rope reel in a direction of taking up the recoil rope;
   a cam disposed rotatably with respect to the support shaft;
   a rotary member on which a one-way clutch mechanism is disposed, and which is to be attached to a crankshaft of an engine, the one-way clutch mechanism being engaged and disengaged with the cam;
   bosses placed respectively on the rope reel and the cam to butt against each other, and which have a same outer diameter; and
   a damper spring placed on outer peripheries of the bosses and having an axial length, ends of which are engaged with the rope reel and the cam, respectively, and which has a torsion coil spring-like shape, wherein:
   a rotational force of the rope reel is transmitted to the cam via an elastic force of the damper spring to start the engine,
   a wire member constituting the damper spring comprises a section shape in which at least an inner peripheral side is linearly formed, thereby enabling an inner side face of the damper spring to be tightly wound in a wide area around outer peripheral faces of the bosses, and
   end faces of the bosses which are formed respectively on the rope reel and the cam butt against each other in a location centered along the axial length of the damper spring.

2. A recoil starter comprising:
   a rope reel rotatably mounted on a support shaft that is formed inside a case and around which a recoil rope is wound;
   a recoil spring which rotationally urges the rope reel in a direction of taking up the recoil rope;
   a cam disposed rotatably with respect to the support shaft;
   a rotary member on which a one-way clutch mechanism is disposed, and which is to be attached to a crankshaft of an engine, the one-way clutch mechanism being engaged and disengaged with the cam;
   bosses placed respectively on the rope reel and the cam to butt against each other, and which have a same outer diameter; and
   a damper spring placed on outer peripheries of the bosses, ends of which are engaged with the rope reel and the cam, respectively, and which has a torsion coil spring-like shape, wherein:
   a rotational force of the rope reel is transmitted to the cam via an elastic force of the damper spring to start the engine,
   a wire member constituting the damper spring comprises a section shape in which at least an inner peripheral side is linearly formed, thereby enabling an inner side face of the damper spring to be tightly wound in a wide area around outer peripheral faces of the bosses, and
   the ends of the damper spring are supported to be radially movable with respect to the rope reel and the cam, wherein when the damper spring is elastically deformed by a starting resistance of the engine, a substantially whole length of a wound portion of the damper spring is uniformly tightly wound around the outer peripheral faces of the bosses respectively formed on the rope reel and the cam.

* * * * *